(12) United States Patent
Chow et al.

(10) Patent No.: US 8,171,204 B2
(45) Date of Patent: *May 1, 2012

(54) INTELLIGENT SOLID-STATE NON-VOLATILE MEMORY DEVICE (NVMD) SYSTEM WITH MULTI-LEVEL CACHING OF MULTIPLE CHANNELS

(75) Inventors: David Q. Chow, San Jose, CA (US); Frank Yu, Palo Alto, CA (US); Charles C. Lee, Cupertino, CA (US); Abraham C. Ma, Fremont, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/115,128

(22) Filed: May 5, 2008

(65) Prior Publication Data

US 2008/0235443 A1  Sep. 25, 2008

Related U.S. Application Data

(60) Continuation-in-part of application No. 12/054,310, filed on Mar. 24, 2008, now Pat. No. 7,877,542, which is a continuation-in-part of application No. 12/035,398, filed on Feb. 21, 2008, now Pat. No. 7,953,931, which is a continuation-in-part of application No. 11/770,642, filed on Jun. 28, 2007, now Pat. No. 7,889,544, which is a continuation-in-part of application No. 11/748,595, filed on May 15, 2007, now Pat. No. 7,471,556, which is a continuation-in-part of application No. 10/818,653, filed on Apr. 5, 2004, now Pat. No. 7,243,185, application No. 12/115,128, which is a continuation-in-part of application No. 12/025,706, filed on Feb. 4, 2008, now Pat. No. 7,886,108, which is a continuation-in-part of application No. 11/871,011, filed on Oct. 11, 2007, now Pat. No. 7,934,074, application No. 12/115,128, which is a continuation-in-part of application No. 11/309,594, filed on Aug. 28, 2006, now Pat. No. 7,383,362, which is a continuation-in-part of application No. 10/707,277, filed on Dec. 2, 2003, now Pat. No. 7,103,684, application No. 12/115,128, which is a continuation-in-part of application No. 11/458,987, filed on Jul. 20, 2006, now Pat. No. 7,690,030, which is a continuation-in-part of application No. 10/761,853, filed on Jan. 20, 2004, now abandoned, application No. 12/115,128, which is a continuation-in-part of application No. 11/624,667, filed on Jan. 18, 2007, now abandoned, which is a division of application No. 09/478,720, filed on Jan. 6, 2000, now Pat. No. 7,257,714.

(51) Int. Cl.
  *G06F 13/00* (2006.01)
(52) U.S. Cl. .. 711/103; 711/202; 711/206; 711/E12.008
(58) Field of Classification Search .................. None
  See application file for complete search history.

(56) References Cited

U.S. PATENT DOCUMENTS 5,680,579 A * 10/1997 Young et al. ................. 711/157
(Continued)

*Primary Examiner* — Hetul Patel
(74) *Attorney, Agent, or Firm* — Stuart T. Auvinen; gPatent LLC

(57) ABSTRACT

A flash memory system stores blocks of data in Non-Volatile Memory Devices (NVMD) that are addressed by a logical block address (LBA). The LBA is remapped for wear-leveling and bad-block relocation by the NVMD. The NVMD are interleaved in channels that are accessed by a NVMD controller. The NVMD controller has a controller cache that caches blocks stored in NVMD in that channel, while the NVMD also contain high-speed cache. The multiple levels of caching reduce access latency. Power is managed in multiple levels by a power controller in the NVMD controller that sets power policies for power managers inside the NVMD. Multiple NVMD controllers in the flash system may each controller many channels of NVMD. The flash system with NVMD may include a fingerprint reader for security.

16 Claims, 14 Drawing Sheets

U.S. PATENT DOCUMENTS

| | | | |
|---|---|---|---|
| 7,257,714 B1 * | 8/2007 | Shen | 713/186 |
| 7,483,329 B2 * | 1/2009 | Luo et al. | 365/226 |
| 2003/0122837 A1 * | 7/2003 | Saxena et al. | 345/566 |
| 2007/0220307 A1 * | 9/2007 | Ishii et al. | 714/5 |

* cited by examiner

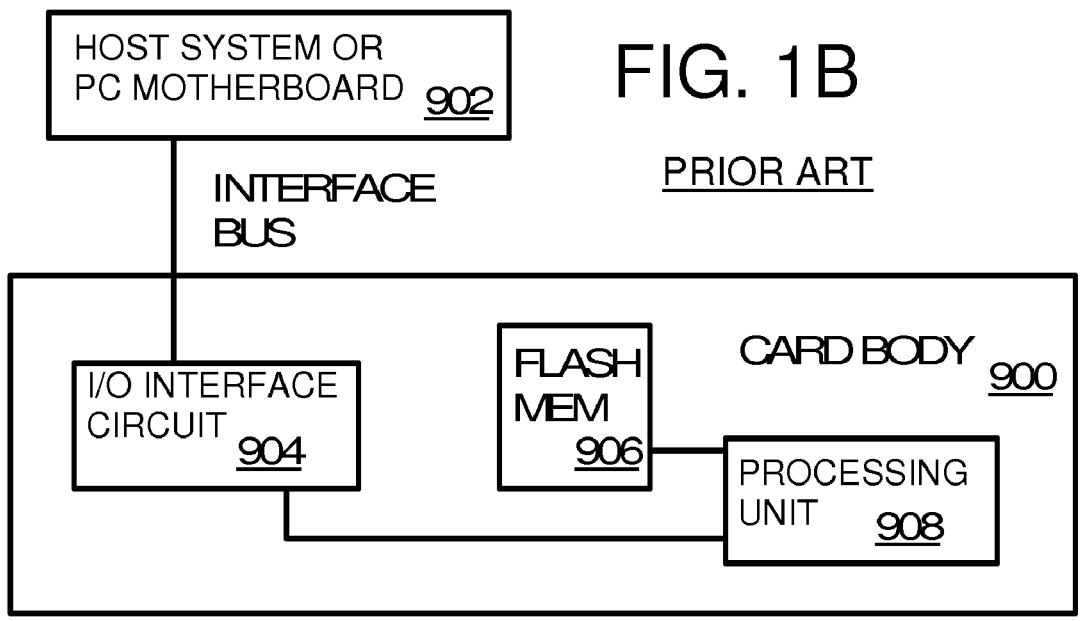
FIG. 1B
PRIOR ART
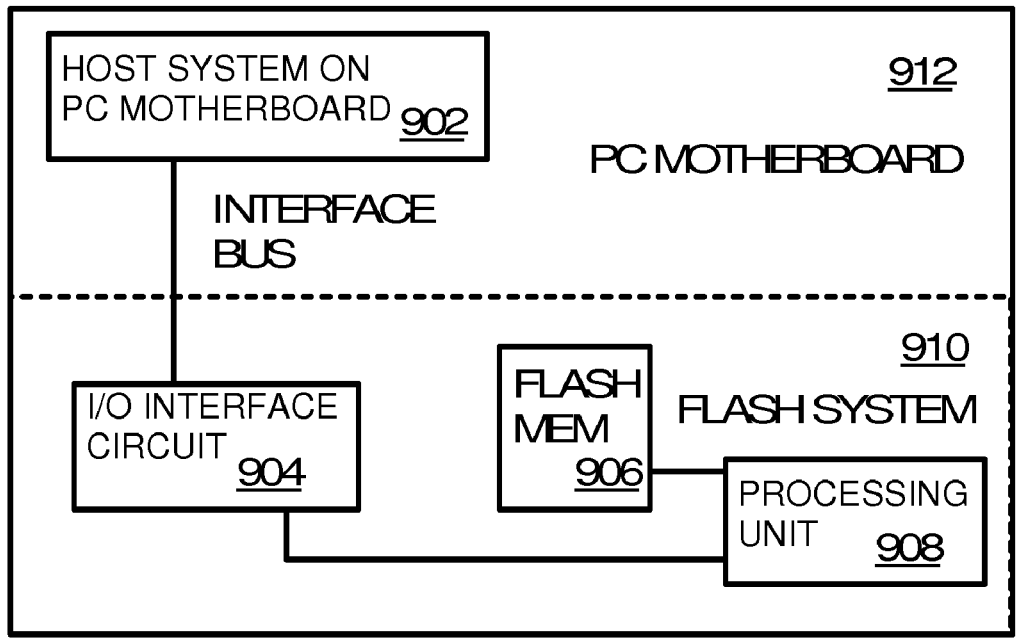
PRIOR ART FIG. 1C

US 8,171,204 B2

INTELLIGENT SOLID-STATE NON-VOLATILE MEMORY DEVICE (NVMD) SYSTEM WITH MULTI-LEVEL CACHING OF MULTIPLE CHANNELS

RELATED APPLICATION

This application is a continuation-in-part (CIP) of U.S. Patent application for "High Integration of Intelligent Non-Volatile Memory Devices", Ser. No. 12/054,310, filed Mar. 24, 2008, now U.S. Pat. No. 7,877,542, which is a CIP of "High Endurance Non-Volatile Memory Devices", Ser. No. 12/035,398, filed Feb. 21, 2008, now U.S. Pat. No. 7,953,931, which is a CIP of "High Speed Controller for Phase Change Memory Peripheral Devices", U.S. application Ser. No. 11/770,642, filed on Jun. 28, 2007, now U.S. Pat. No. 7,889,544, which is a CIP of "Local Bank Write Buffers for Acceleration a Phase Change Memory", U.S. application Ser. No. 11/748,595, filed May 15, 2007, now U.S. Pat. No. 7,471,556, which is CIP of "Flash Memory System with a High Speed Flash Controller", application Ser. No. 10/818,653, filed Apr. 5, 2004, now U.S. Pat. No. 7,243,185.

This application is also a CIP of U.S. Patent Application for "Method and Systems of Managing Memory Addresses in a Large Capacity Multi-Level Cell (MLC) based Memory Device", Ser. No. 12/025,706, filed on Feb. 4, 2008, now U.S. Pat. No. 7,886,108, which is a CIP application of "Flash Module with Plane-Interleaved Sequential Writes to Restricted-Write Flash Chips", Ser. No. 11/871,011, filed Oct. 11, 2007, now U.S. Pat. No. 7,934,074.

This application is a continuation-in-part (CIP) of U.S. Patent Application for "Single-Chip Multi-Media Card/Secure Digital controller Reading Power-on Boot Code from Integrated Flash Memory for User Storage", Ser. No. 11/309,594, filed on Aug. 28, 2006, now U.S. Pat. No. 7,383,362, which is a CIP of U.S. Patent Application for "Single-Chip USB Controller Reading Power-On Boot Code from Integrated Flash Memory for User Storage", Ser. No. 10/707,277, filed on Dec. 2, 2003, now issued as U.S. Pat. No. 7,103,684.

This application is also a CIP of U.S. Patent Application for "Electronic Data Flash Card with Fingerprint Verification Capability", Ser. No. 11/458,987, filed Jul. 20, 2006, now U.S. Pat. No. 7,690,030, which is a CIP of U.S. Patent Application for "Highly Integrated Mass Storage Device with an Intelligent Flash Controller", Ser. No. 10/761,853, filed Jan. 20, 2004, now abandoned.

This application is also a CIP of U.S. patent application Ser. No. 11/624,667 filed on Jan. 18, 2007, entitled "Electronic data Storage Medium with Fingerprint Verification Capability", now abandoned, which is a divisional patent application of U.S. patent application Ser. No. 09/478,720 filed on Jan. 6, 2000, now U.S. Pat. No. 7,257,714.

FIELD OF THE INVENTION

This invention relates to flash-memory systems, and more particularly to multiple levels of intelligent controllers of flash memory.

BACKGROUND OF THE INVENTION

Data files stored on a floppy disk or diskette may require a password for access, or may use encryption to secure the data within the file. Confidential documents can be delivered over a network by adding safety seals and impressions. However, the confidential data is at risk due to breaking of the passwords, encryption codes, safety seals and impressions, thereby resulting in unsecure transfer of the information.

The parent application, now U.S. Pat. No. 7,257,714, disclosed an electronic data storage medium that had fingerprint verification capability. FIG. 1A shows an electronic data flash card. Electronic data flash card 10 is adapted to be accessed by motherboard or external (host) computer 9 either through interface bus 13 or card reader 12 or other interface mechanism (not shown), and includes card body 1, processing unit 2, one or more flash memory devices 3, fingerprint sensor 4, input/output interface circuit 5, optional display unit 6, optional power source (e.g., battery) 7, and optional function key set 8.

Flash memory device 3 is mounted on card body 1, stores in a known manner therein one or more data files, a reference password, and the reference fingerprint data obtained by scanning a fingerprint of one or more authorized users of electronic data flash card 10. Only authorized users can access the stored data files. The data file can be a picture file or a text file.

Fingerprint sensor 4 is mounted on card body 1, and is adapted to scan a fingerprint of a user of electronic data flash card 10 to generate fingerprint scan data. One example of fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference.

The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

Input/output interface circuit 5 is mounted on card body 1, and can be activated so as to establish communication with host computer 9 by way of an appropriate socket via interface bus 13 or card reader 12. In one embodiment, input/output interface circuit 5 includes circuits and control logic associated with a Universal Serial Bus (USB), PCMCIA or RS232 interface structure that is connectable to an associated socket connected to or mounted on host computer 9. In another embodiment, input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with host computer 9 via interface bus 13 or card reader 12.

Processing unit 2 is mounted on card body 1, and is connected to flash memory device 3, fingerprint sensor 4 and input/output interface circuit 5 by way of associated conductive traces or wires disposed on card body 1. In one embodiment, processing unit 2 is one of an 8051, 8052, 80286 microprocessors available, for example, from Intel Corporation. In other embodiments, processing unit 2 includes a RISC, ARM, MIPS or other digital signal processors (DSP).

In accordance with an aspect of the present invention, processing unit 2 is controlled by a program stored at least partially in flash memory device 3 such that processing unit 2 is operable selectively in: (1) a programming mode, where processing unit 2 activates the input/output interface circuit 5 to receive the data file and the reference fingerprint data from host computer 9, and to store the data file and the reference fingerprint data in flash memory device 3; (2) a data retrieving mode, where processing unit 2 activates the input/output interface circuit 5 to transmit the data file stored in flash memory device 3 to host computer 9; and (3) a data resetting mode, where the data file and the reference finger data are erased from the flash memory device 3. In operation, host computer 9 sends write and read requests to electronic data flash card 10 via interface bus 13 or card reader 12 and input/output interface circuit 5 to processing unit 2, which in turn utilizes a flash memory controller (not shown) to read from or write to the associated one or more flash memory devices 3. In one embodiment, for further security protection, processing unit 2 automatically initiates operation in the data resetting mode upon detecting that a preset time period has elapsed since the last authorized access of the data file stored in the flash memory device 3.

Optional power source 7 is mounted on card body 1, and is connected to processing unit 2 and other associated units on card body 1 for supplying electrical power thereto.

Optional function key set 8, which is mounted on card body 1, is connected to processing unit 2, and is operable so as to initiate operation of processing unit 2 in a selected one of the programming, data retrieving and data resetting modes. The function key set 8 is operable to provide an input password to processing unit 2. Processing unit 2 compares the input password with the reference password stored in the flash memory device 3, and initiates authorized operation of electronic data flash card 10 upon verifying that the input password corresponds with the reference password.

Optional display unit 6 is mounted on card body 1, and is connected to and controlled by processing unit 2 for showing the data file exchanged with host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

FIG. 1B shows an electronic data flash card in a card body as a portable flash device. Host system or PC motherboard 902 sends commands, addresses, and data over an interface bus to I/O interface circuit 904 on card body 900. These commands cause processing unit 908 to write, read, or erase blocks of flash memory 906. Card body 900 can be a plastic card body with a connector that fits into a slot on the host.

FIG. 1C shows an electronic data flash card integrated onto the PC motherboard. Host system or PC motherboard 902 sends commands, addresses, and data over an interface bus to I/O interface circuit 904 on flash system 910, which is a portion of motherboard 902. These commands cause processing unit 908 to write, read, or erase blocks of flash memory 906. Flash system 910 does not need a connector or a casing since it is integrated directly on the PC motherboard.

FIG. 1D shows an electronic data flash card in a flash module. Host system or PC motherboard 902 sends commands, addresses, and data over an interface bus to I/O interface circuit 904 on flash module 914. These commands cause processing unit 908 to write, read, or erase blocks of flash memory 906. Flash module 914 can be a printed-circuit-board-assembly (PCBA) that is mounted on the PC motherboard, or a module similar to a memory module that fits into a socket on the PC motherboard.

What is desired is a flash system with multiple levels of control. Multiple levels of caching are also desired in a flash system. Multiple levels of power management control are also desirable. A flash system using Non-Volatile Memory Devices (NVMD) that are addressable with logical block addresses rather than physical addresses are also desirable with multiple levels of controllers.

BRIEF DESCRIPTION OF THE DRAWINGS

FIG. 1B shows an electronic data flash card in a card body as a portable flash device.

FIG. 1C shows an electronic data flash card integrated onto the PC motherboard.

DETAILED DESCRIPTION

The present invention relates to an improvement in intelligent flash memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2A:
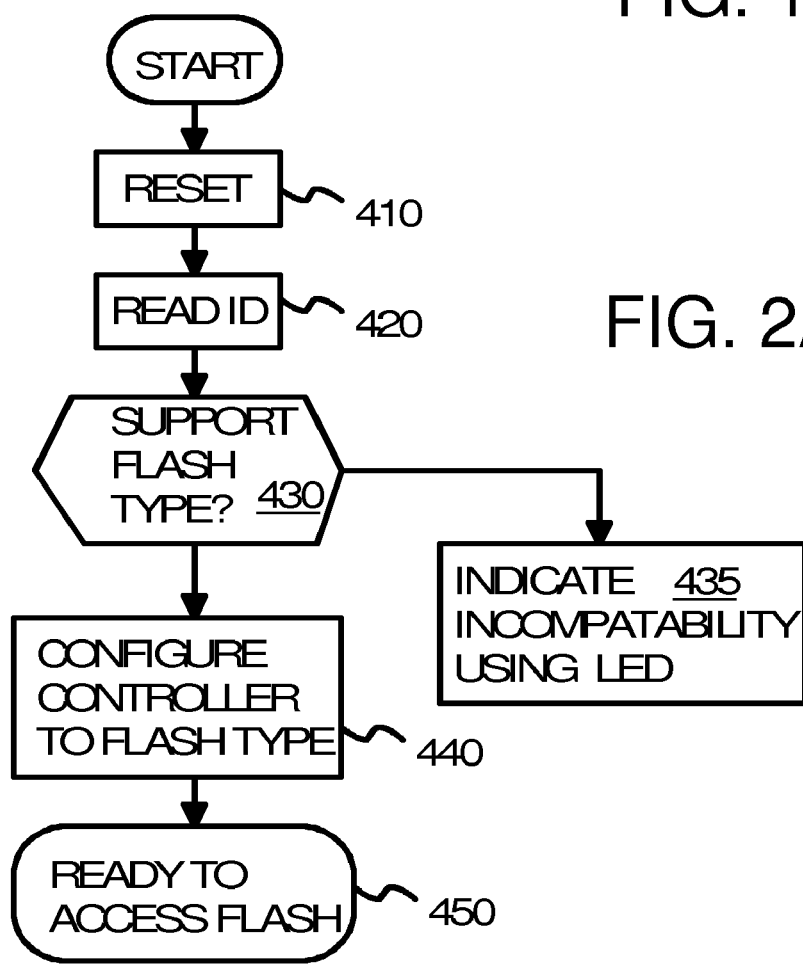
FIG. 2A illustrates a flash detection algorithm.

FIG. 2A illustrates a flash detection algorithm. First, the processing unit is reset, step 410. Next, the ID of the flash memory is read to identify the flash memory type, step 420. The read ID is then compared against the table of flash types that are supported by the existing flash memory controller, step 430. If the flash type is not supported, step 435, the flash memory controller will not be able to access the flash memory, and the incompatibility can be indicated by LED via an output port of the controller. If the flash type is supported, the flash memory controller will be configured to the access mode corresponding to that detected flash type, step 440, and then the flash memory controller begins accessing the flash memory, step 450.

Figure 2B:
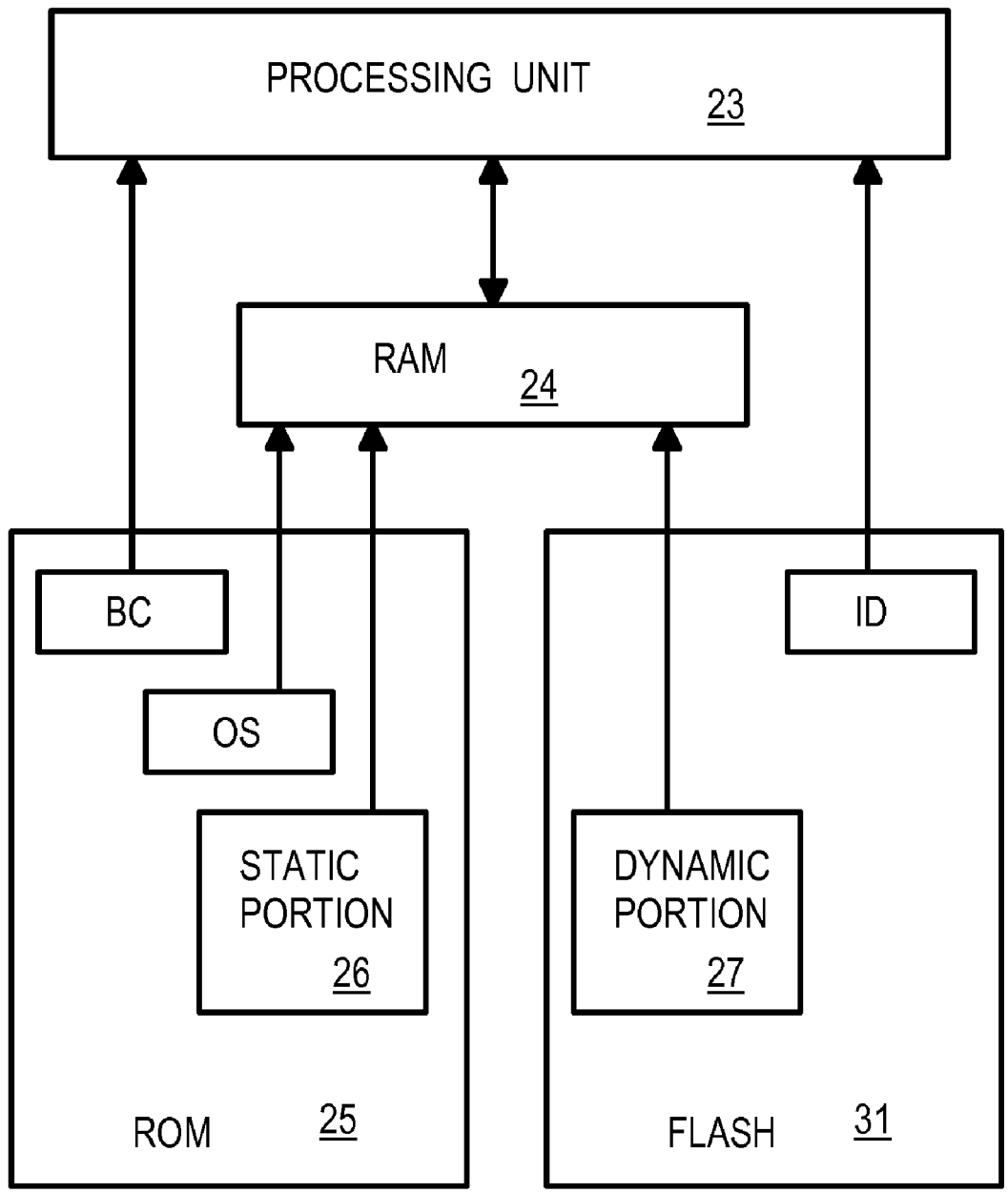
FIG. 2B shows an electronic data flash card with static and dynamic portions of detection code.

Electronic data flash cards are flash memory systems using flash memories for data storage. FIG. 2B shows an electronic data flash card with static and dynamic portions of detection code. An electronic data flash card includes processing unit 23, flash memory 31, random-access memory (RAM) 24, and read-only memory (ROM) 25, with the boot code (BC) and operating system (OS) code residing in ROM 25. Upon power up, processing unit 23 fetches and executes the boot code from ROM 25, which initializes the system components and loads the OS code from ROM 25 into RAM 24. Once the OS code is loaded into the RAM 24, it takes control of the system. The OS includes drivers to perform basic tasks such as controlling and allocating memory, prioritizing the processing of instructions, controlling input and output ports etc. The OS code also includes the flash detection algorithm code and the flash parametric data.

Because of the permanent nature of data stored in a ROM, after the flash memory controller of a conventional electronic data flash card is designed and put into production, the software in ROM is frozen and cannot be changed to support new flash types released to the market at a later time. In such a situation, the development of a new flash memory controller has to support new flash memories from time to time, which is costly and time consuming.

The electronic data flash card includes a flash detection algorithm code that is separated into static portion 26 and dynamic portion 27, with static portion 26 handling contemporary flash memories, and dynamic portion 27 taking control of the detection process after the static portion fails to identify the particular flash memory device implemented in the electronic data flash card. That is, when the electronic data flash card is manufactured using an "old" type flash memory device, then the flash detection algorithm code recognizes the flash device ID during the power up process, and utilizes static portion 26 to execute read and write the "old" type flash memory device. Conversely, when a particular electronic data flash card having the novel configuration is manufactured using a "new" type flash memory device, then the flash detection algorithm code recognizes the flash device ID during the power up process, and utilizes dynamic portion 27 to execute read and write operations to "new" type flash memory device 31.

With this configuration, static portion 26 of the flash detection algorithm code is stored in ROM 25, but dynamic portion 27 of the flash detection algorithm code is stored in at least one flash memory device 31 of the electronic data flash card. By storing dynamic portion 27 along with data (not shown) in at least one flash memory device 31, not only can the size of ROM 25 be reduced, new flash types can be supported without hardware alteration. That is, if at some point the decision is made to implement a "new" flash memory type (i.e., that is not supported by the static portion), instead of having to replace the entire ROM, the process simply requires storing a suitable dynamic portion of the flash algorithm code in the one or more flash memory device. Because the default access and reading of the dynamic portion is already incorporated into execution of the flash detection algorithm code, the content of the dynamic portion can be altered without affecting operation of the flash detection algorithm code. Thus, overall manufacturing costs are reduced, and unnecessary development time is also eliminated.

Figure 3:
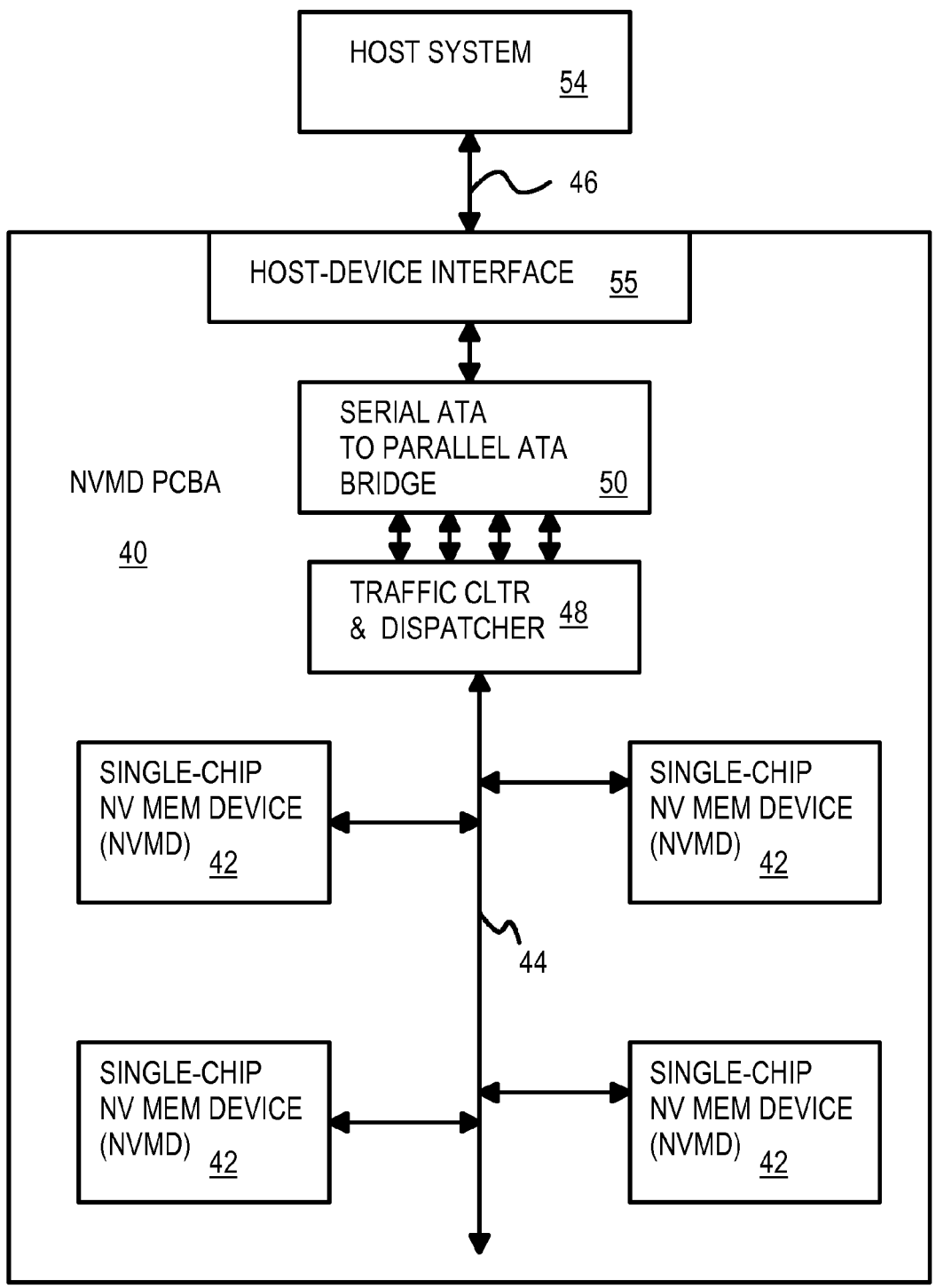
FIG. 3 shows a flash system with an interface to a host, and parallel internal interfaces to multiple Non-Volatile Memory Devices (NVMD).

Non-Volatile Memory Device (NVMD) System—FIG. 3

FIG. 3 shows a flash system with an interface to a host, and parallel internal interfaces to multiple Non-Volatile Memory Devices (NVMD). Host system 54 communicates over host bus 46 with Non-Volatile Memory Device (NVMD) printed-circuit-board-assembly (PCBA) system 40. Host-device interface 55 receives commands, address, and data from host bus 46 and sends data back over host bus 46 in response to commands.

There may be parallel lanes on host bus 46, or host bus 46 may be a basically serial interface, with all serial lanes carrying commands, addresses, and data for a same transaction at any one time. A parallel PCIe interface could also be used for host bus 46. Bridge 50 converts serial commands from host-device interface 55 to commands that can be processed in parallel within system 40. For example, serial AT-attachment (SATA) signals carried by host bus 46 can be converted to parallel ATA signals (PATA) by bridge 50. Traffic controller and dispatcher 48 sends the parallel PATA signals over internal bus 44 to different ones of NVMD 42. One NVMD 42 can process one of the PATA requests, while another one of NVMD 42 can process another PATA request. Thus the multiple NVMD 42 are accessed in parallel by traffic controller and dispatcher 48.

NVMD 42 contain address or block mapping tables and controllers and are able to remap logical block addresses (LBA) to physical block addresses (PBA). Thus internal bus 44 carries LBA's. The distributed block mapping performed by the multiple NVMD 42 can be coordinated by software or firmware running on host 54 or on a microcontroller or processor (not shown) on system 40.

Figure 4:
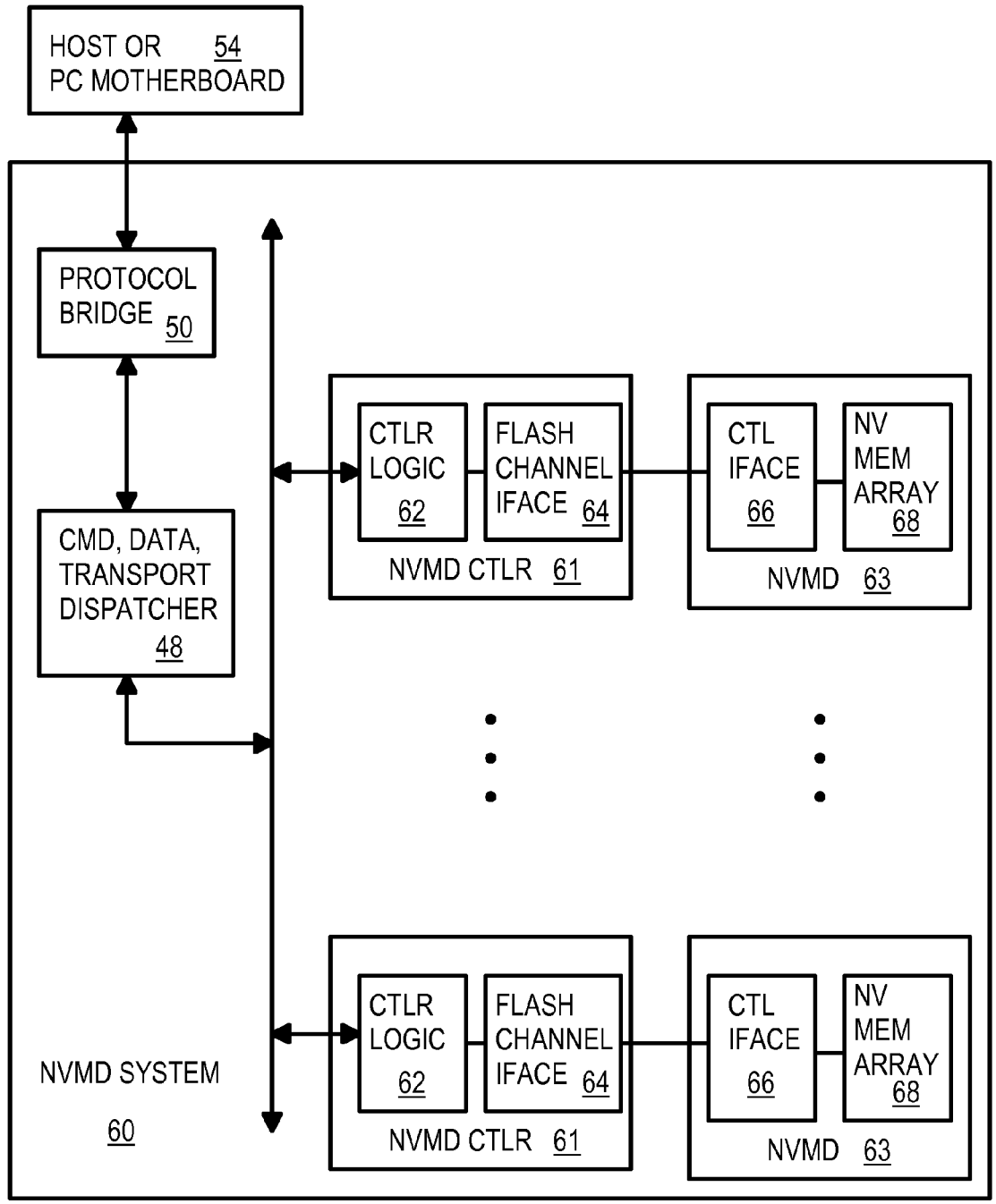
FIG. 4 shows a NVMD system using parallel NVMD controllers to NVMD chips.

FIG. 4 shows a NVMD system using parallel NVMD controllers to NVMD chips. Host 54 communicates with NVMD system 60 over a host bus such as SATA. Bridge 50 converts SATA to parallel ATA (PATA) requests, which are distributed among the many NVMD 63 by traffic controller and dispatcher 48.

NVMD controllers 61 receive PATA requests from traffic controller and dispatcher 48 over an internal bus, and act as local flash controllers. Each NVMD controller 61 has control logic 62 for interfacing with the internal bus generated by traffic controller and dispatcher 48, and flash channel interface 64 that sends flash commands to NVMD 63 that is controlled by NVMD controller 61. Control interface 66 in NVMD 63 receives these flash commands and performs reads, writes, and erases of NV memory array 68 in NVMD 63.

NVMD 63 may contain remapping tables or logic, allowing NVMD controller 61 to send LBA logical addresses to NVMD 63, rather than physical block addresses (PBA). Since each NVMD 63 performs its own LBA to PBA mapping, the block mapping is performed in a distributed fashion, rather than centrally. Each NVMD maps blocks within its range of addresses, allowing traffic controller and dispatcher 48 to merely assign new block-write requests in a round-robin fashion to the available NVMD controllers 61. Block reads may be assigned by looking up the LBA's in a central mapping table used by traffic controller and dispatcher 48.

Figure 5:
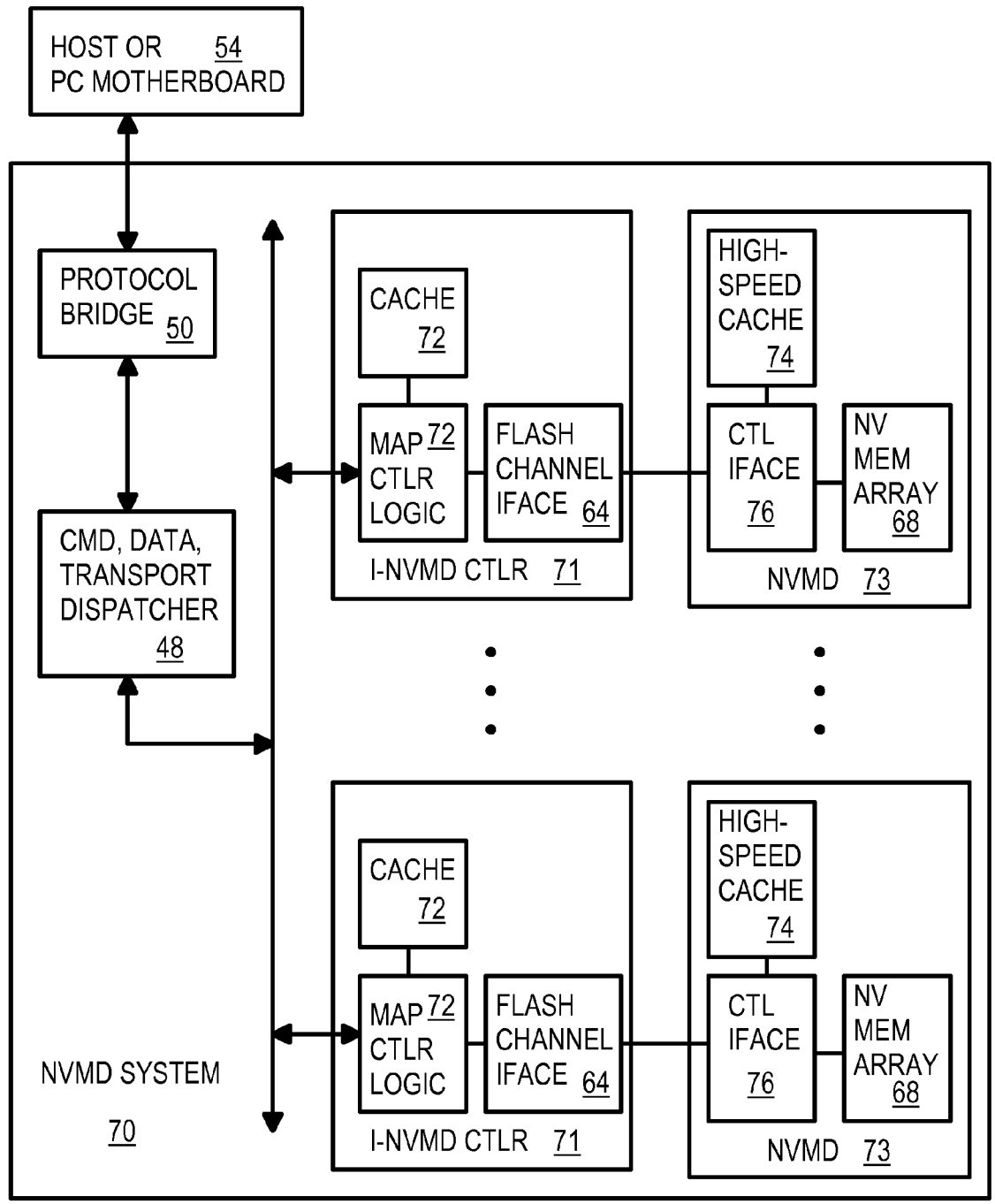
FIG. 5 shows a NVMD system using intelligent NVMD controllers with multiple levels of distributed caching.

FIG. 5 shows a NVMD system using intelligent NVMD controllers with multiple levels of distributed caching. NVMD system 70 distributes requests from host 54 that are receives through bridge 50 using traffic controller and dispatcher 48.

Requests from traffic controller and dispatcher 48 are distributed among intelligent NVMD controllers 71. Intelligent NVMD controller 71 may store blocks of data in controller cache 72. Map controller logic 72 may temporarily map some blocks to controller cache 72 rather than to flash memory in NV memory array 68. Write data may be accumulated in controller cache 72 before being sent by flash channel interface 64 to NVMD 73 for writing into NV memory array 68. Read requests may be satisfied by blocks of data in controller cache 72, avoiding a slower read of flash memory.

Data being written into NV memory array 68 may be first stored in high-speed cache 74 by control interface 76 before being written into NV memory array 68. Data may be supplied by high-speed cache 74 rather than by NV memory array 68 for reads of recently-accessed data.

While controller cache 72 may store many blocks of flash data, high-speed cache 74 may only store one or two blocks. Thus high-speed cache 74 may act more as a buffer, while controller cache 72 acts as a longer-term cache. This caching at both the controller and the flash device level can be beneficial by caching large blocks of data in controller cache 72, yet also allowing for high-speed access of data in the process of being written into NV memory array 68 using high-speed cache 74. Since there may be many pairs of intelligent NVMD controller 71 and NVMD 73, the caching is further distributed among the parallel NVMD in NVMD system 70. A large total amount of cache is available without having a large, slow central cache.

Figure 6A:
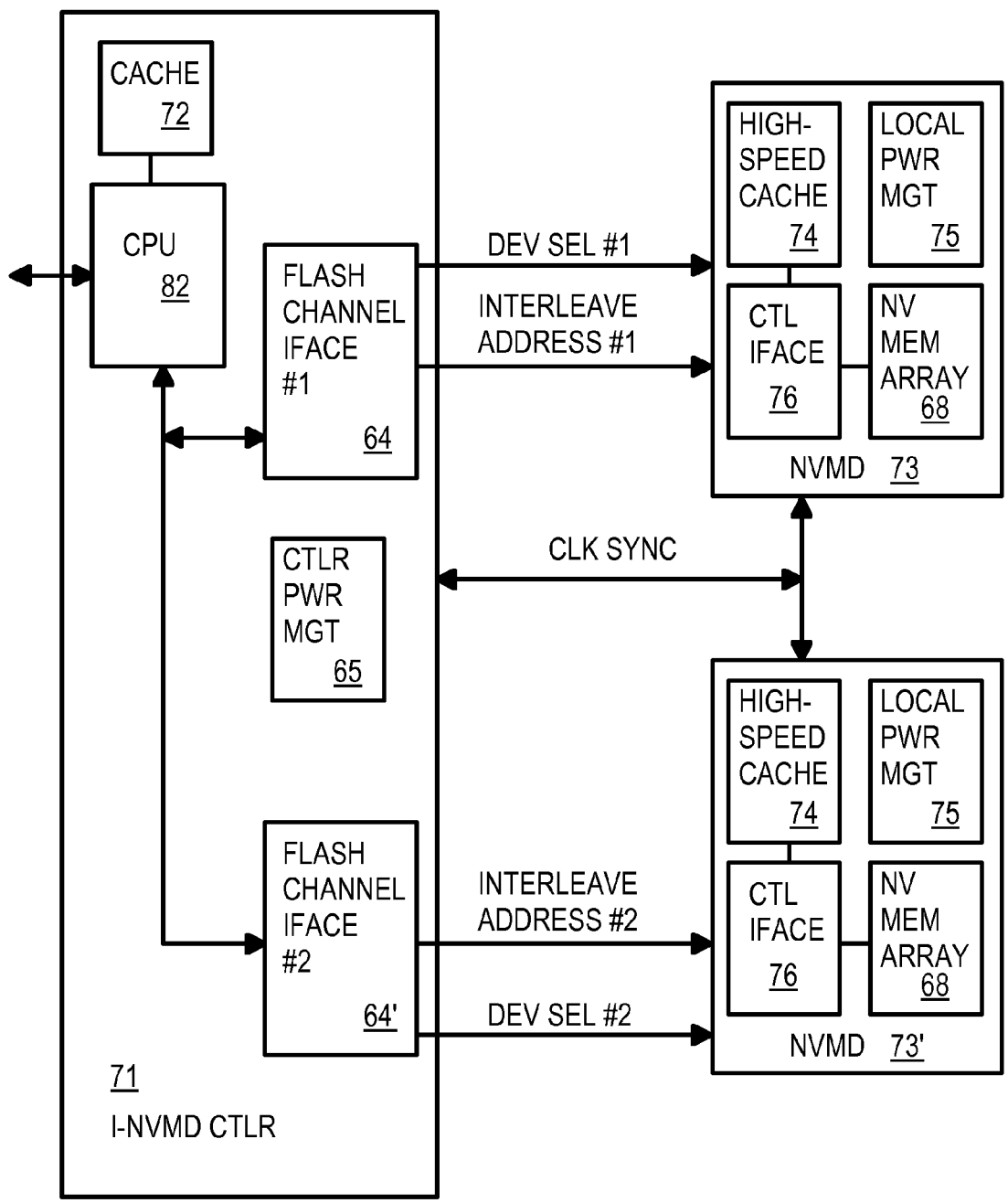
FIG. 6A highlights interleaving among two channels of flash using NVMD.

FIG. 6A highlights interleaving among two channels of flash using NVMD. An internal bus connects to multiple intelligent NVMD controllers 71. CPU 82 is a processor that receives and decodes requests sent over the internal bus. Blocks of flash data may be cached in controller cache 72 by CPU 82, which may execute routines of instructions in firmware or in a code or main memory (not shown).

Each intelligent NVMD controller 71 may have multiple channels of flash memory. In this example, 2 channels are accessed by intelligent NVMD controller 71. CPU 82 sends some requests to first flash channel interface 64, for data stored in NV memory array 68 in NVMD 73, while other requests are sent by CPU 82 to second flash channel interface 64', for data stored in NV memory array 68 in NVMD 73'.

First flash channel interface 64 generates interleaved addresses #1 and device select #1 that address and enable NVMD 73. Write data may be buffered by high-speed cache 74 before being written into NV memory array 68 by control interface 76. Second flash channel interface 64' generates interleaved addresses #2 and device select #2 that address and enable NVMD 73'.

A clock source is applied to both NVMD 73, 73'. This clock synchronizes data transfers with flash channel interfaces 64, 64'. Synchronous bus transfers are performed over the two channels. Entire blocks, rather than pages, are sent over the flash channels, and LBA's, rather than PBA's are used in the flash channels.

President-Governor Power Management

Power management is handled on multiple levels using a president-governor scheme. Controller power manager 65 controls overall power policy for all NVMD 73, 73' for all flash channels. The policy set at the President level is carried out at the Governor level by NVMD power controllers 75 in each of NVMD 73, 73'. For example, controller power manager 65 can turn off or reduce power to a channel by instructing NVMD power controller 75 in NVMD 73' to reduce power or to power down.

Figure 6B:
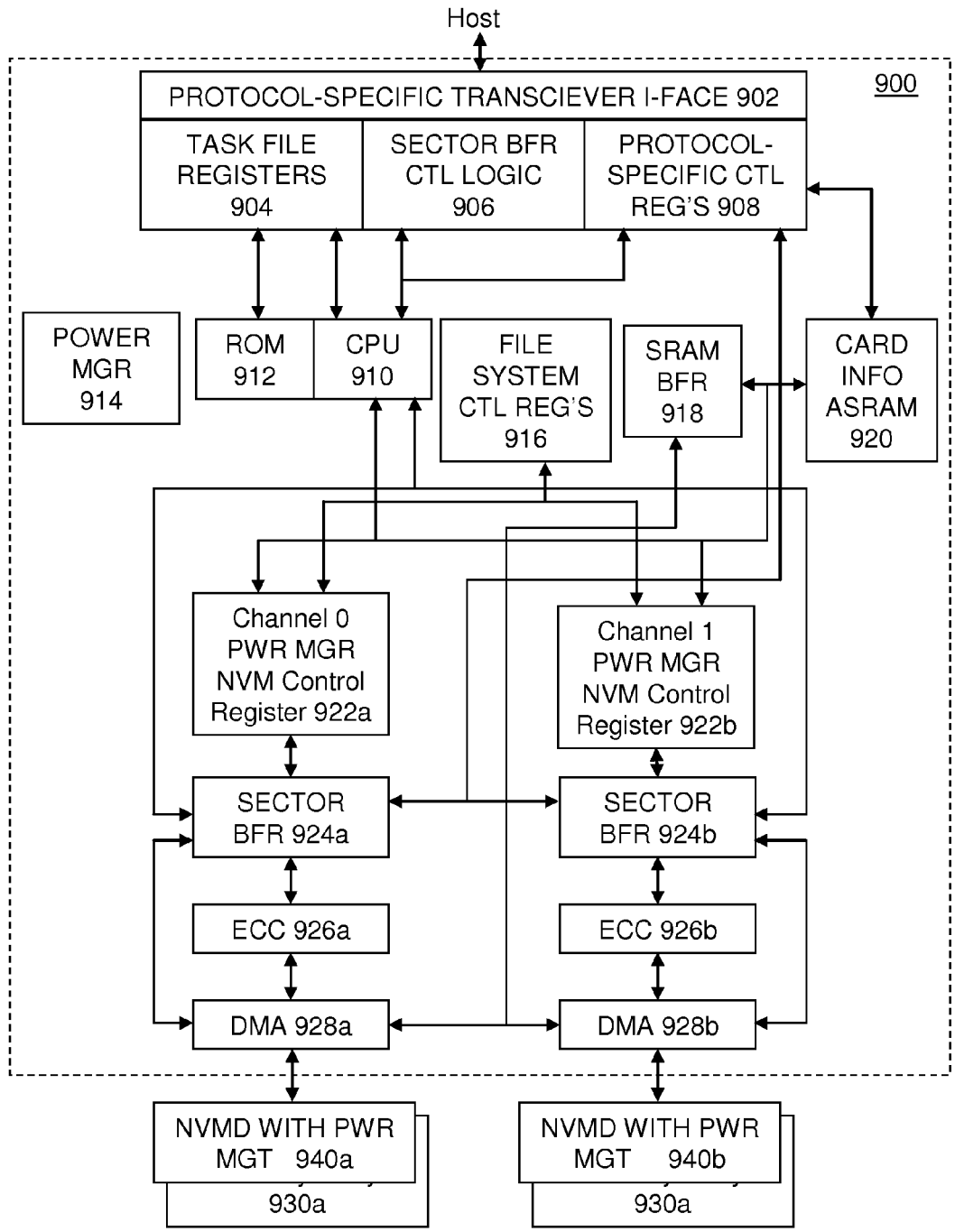
FIG. 6B shows another exemplary NVMD system that includes a dual-channel controller together with NV memory arrays.

FIG. 6B shows another exemplary NVMD system that includes a dual-channel controller together with NV memory arrays. NV memory arrays 940*a-b* can be accesses concurrently. Controller 900 includes protocol-specific transceiver interface 902, task file register 904, sector buffer control logic 906, protocol-specific control registers 908, CPU 910, read-only memory (ROM) 912, controller power manager 914, file system control registers 916, static random access memory (SRAM) buffer 918 and asynchronous SRAM 920. SRAM buffer 918 is configured to store flash command status. ASRAM 920 is configured to store protocol-specific information, such as for an ATA protocol.

For each of the dual channels, protocol-specific controller 900 includes channel power manager and protocol-specific control registers 922*a-b*, sector buffer 924*a-b*, ECC module 926*a-b*, and direct memory access (DMA) engine 928*a-b*. DMA engine 928*a-b* is configured for NV memory programming. ECC module 926*a-b* is configured to create error correction code and to detect and correct data errors in sector buffer 924*a-b* if possible.

Power is controlled by a power controller in each of NV memory arrays 940*a-b*. Power policy is set by power manager and protocol-specific control registers 922*a-b* in controller 900.

Figure 7:
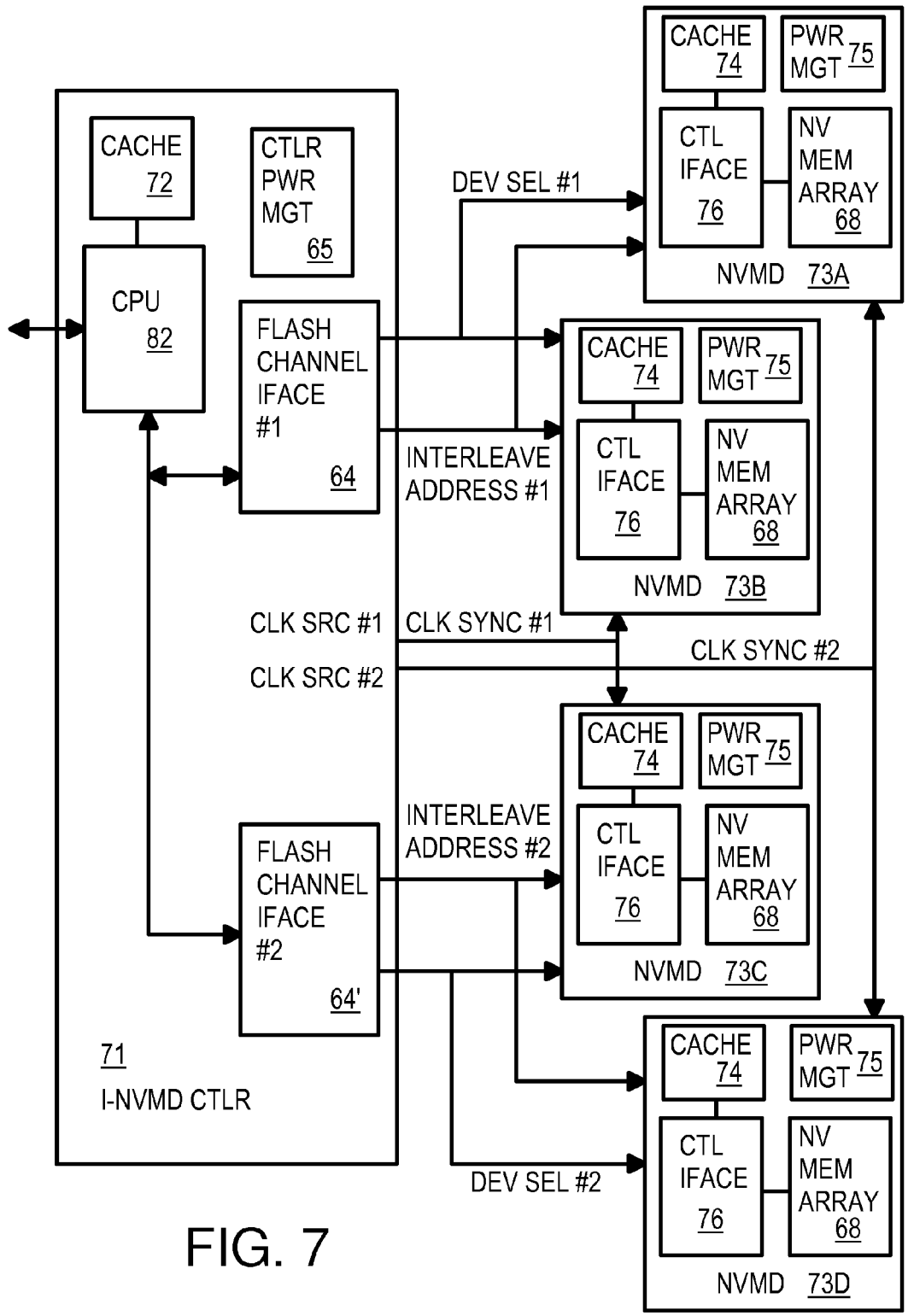
FIG. 7 highlights four-way interleaving among two channels of flash using NVMD.

FIG. 7 highlights four-way interleaving among two channels of flash using NVMD. An internal bus connects to multiple intelligent NVMD controllers 71. CPU 82 is a processor that receives and decodes requests sent over the internal bus. Blocks of flash data may be cached in controller cache 72 by CPU 82, which may execute routines of instructions in firmware or in a code or main memory (not shown).

Each intelligent NVMD controller 71 may have multiple channels of flash memory. In this example, two channels are accessed by intelligent NVMD controller 71, and each channel accesses two NVMD'S. CPU 82 sends some requests to first flash channel interface 64, for data stored in NV memory arrays 68 in NVMD 73A, 73B, while other requests are sent by CPU 82 to second flash channel interface 64', for data stored in NV memory arrays 68 in NVMD 73C, 73D.

First flash channel interface 64 generates interleaved addresses #1 and device select #1 that address and enable both NVMD 73A, 73B. Write data may be buffered by high-speed cache 74 before being written into NV memory array 68 by control interface 76. Second flash channel interface 64' generates interleaved addresses #2 and device select #2 that address and enable both NVMD 73C, 73D.

Two clock sources are used. Clock source #1 drives first clock CLK SYNC #1 to second and third NVMD 73B, 73C, while clock source #2 drives second clock CLK SYNC #2 to first and fourth NVMD 73A, 73D. The two clocks may be non-overlapping in time, allowing selection between NVMD 73A, 73B in the first channel, or among NVMD 73C, 73D in the second channel. One clock source may be stopped while the other clock is being pulsed. The clock sources could also be an interleave select signal or an address bit.

Controller cache 72 caches flash blocks for all four of NVMD 73A, 73B, 73C, 73D for both flash channels. High-speed caches 74 in each NVMD cache blocks during writing or reading and are less persistent than blocks in controller cache 72.

President-Governor Power Management

Power management is handled on multiple levels using a president-governor scheme. Controller power manager 65 controls overall power policy for all NVMD 73A, 73B, 73C, 73D for all flash channels. The policy set at the President level is carried out at the Governor level by NVMD power controllers 75 in each of NVMD 73A, 73B, 73C, 73D. For example, controller power manager 65 can turn off or reduce power to a channel by instructing NVMD power controller 75 in that channel to reduce power or to power down.

Figure 8:
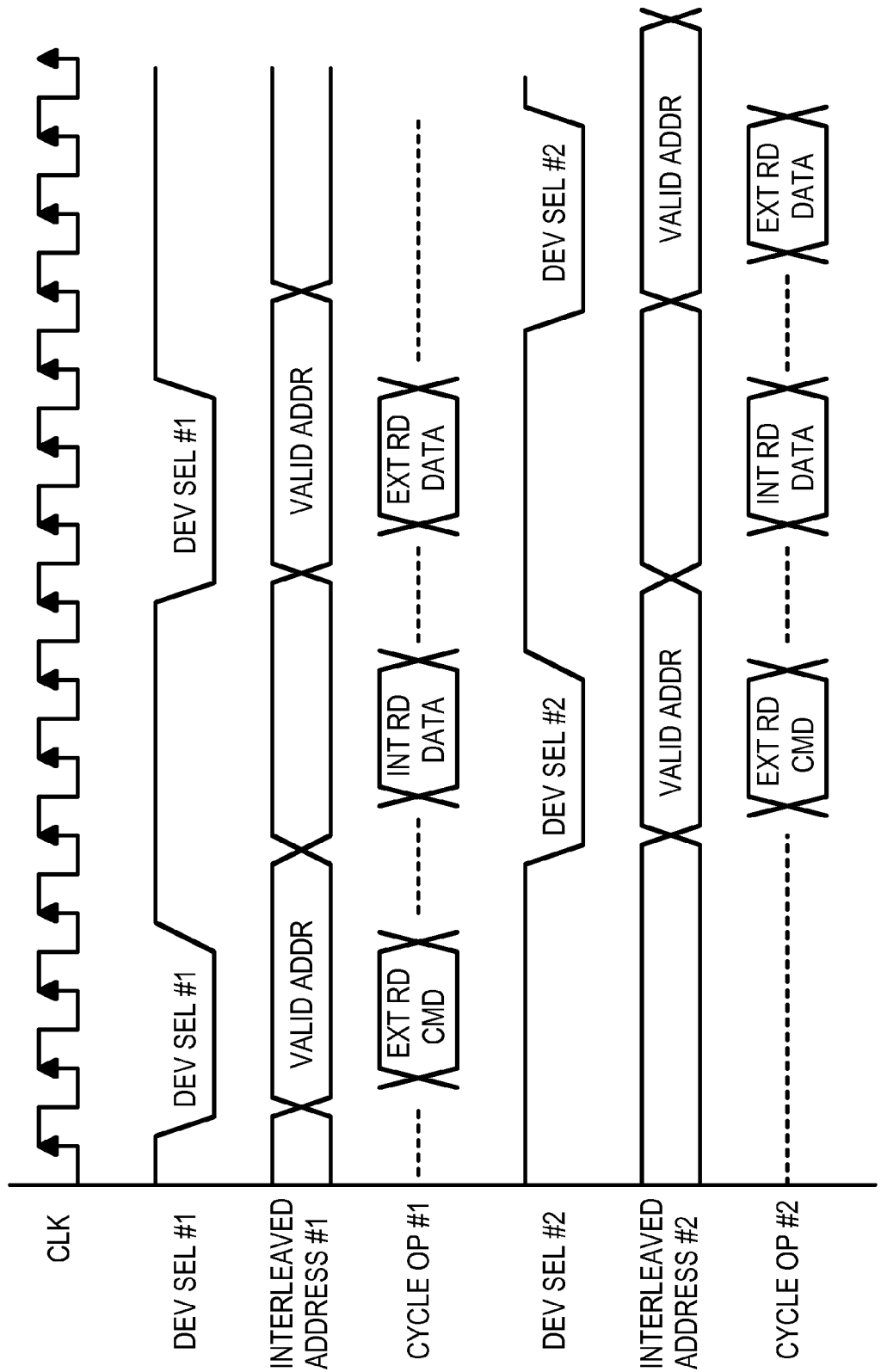
FIG. 8 is a waveform diagram of concurrent reads to dual flash channels with distributed multi-level caching.

FIG. 8 is a waveform diagram of concurrent reads to dual flash channels with distributed multi-level caching. Device select #1 is pulsed low and interleaved address #1 is latched into the NVMD. This is the external read operation between intelligent NVMD controller 71 and NVMD 73. The internal read of the NV memory array is performed over the next several clock cycles. The data is then read to the intelligent NVMD controller as the external read operation as the next address is latched in.

Device select #2 is pulsed low during the internal read of device #1. Interleaved address #2 is latched into the NVMD. This is the external read operation between intelligent NVMD controller 71 and another one of NVMD 73. The internal read of the NV memory array is performed over the next several clock cycles. The data is then read to the intelligent NVMD controller as the external read operation as the next address is latched in for device #2.

When the read data is already in high-speed cache 74, the internal read operation may be faster. When the read data hits in controller cache 72, then no read operation is required at all, and the device select is not pulsed low.

Figure 9:
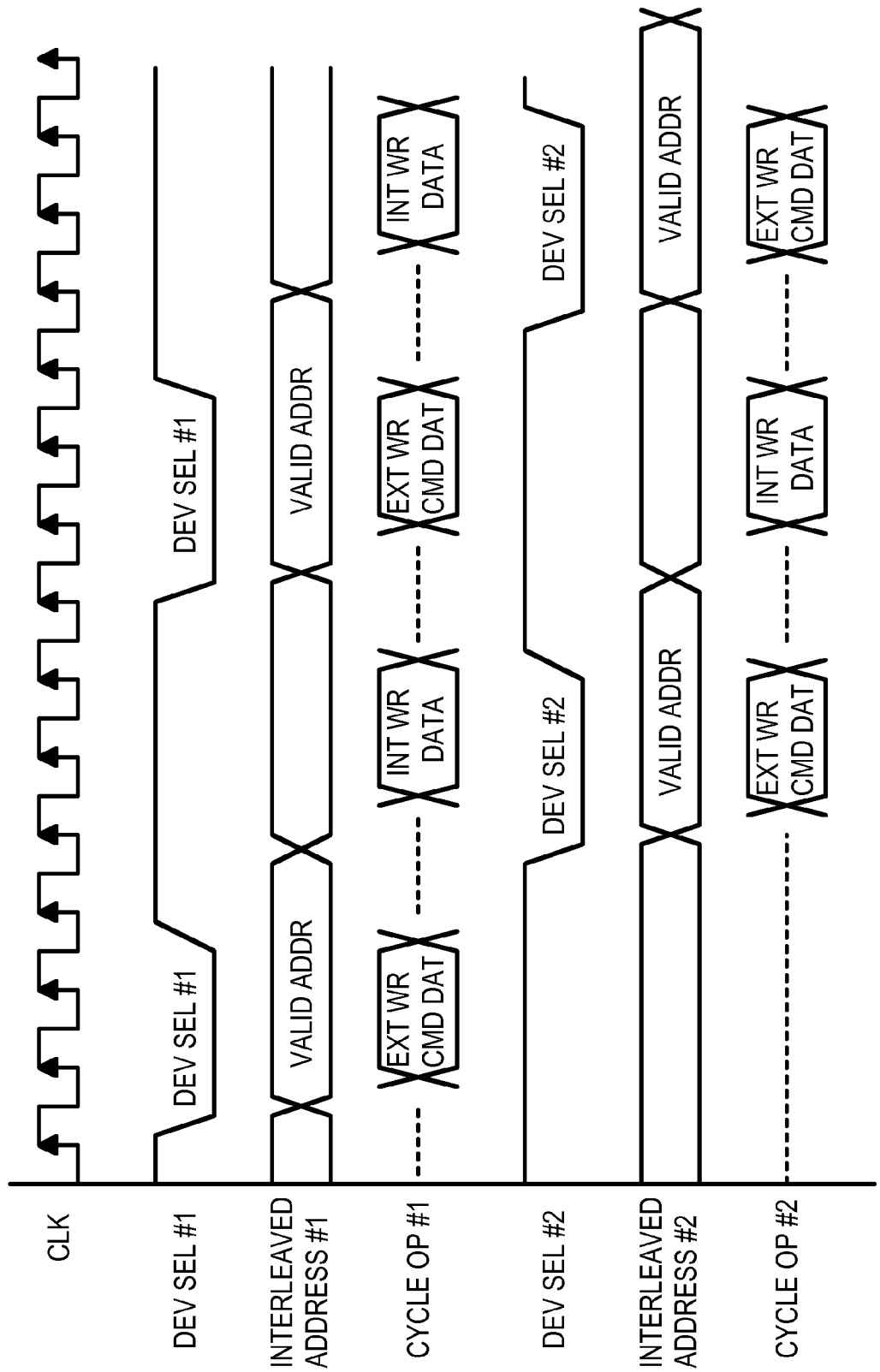
FIG. 9 is a waveform diagram of a concurrent writes to dual flash channels with distributed multi-level caching.

FIG. 9 is a waveform diagram of a concurrent writes to dual flash channels with distributed multi-level caching. Device select #1 is pulsed low and interleaved address #1 and the write data is latched into the NVMD. This is the external write operation between intelligent NVMD controller 71 and NVMD 73. The internal write of the NV memory array is performed over the next several clock cycles.

Device select #2 is pulsed low during the internal write of device #1. Interleaved address #2 and the write data are latched into the NVMD. This is the external write operation between intelligent NVMD controller 71 and another one of NVMD 73. The internal write of the NV memory array is performed over the next several clock cycles. Once the data has been internally written to the NV memory cells, the next internal write operation may begin.

Figure 10:
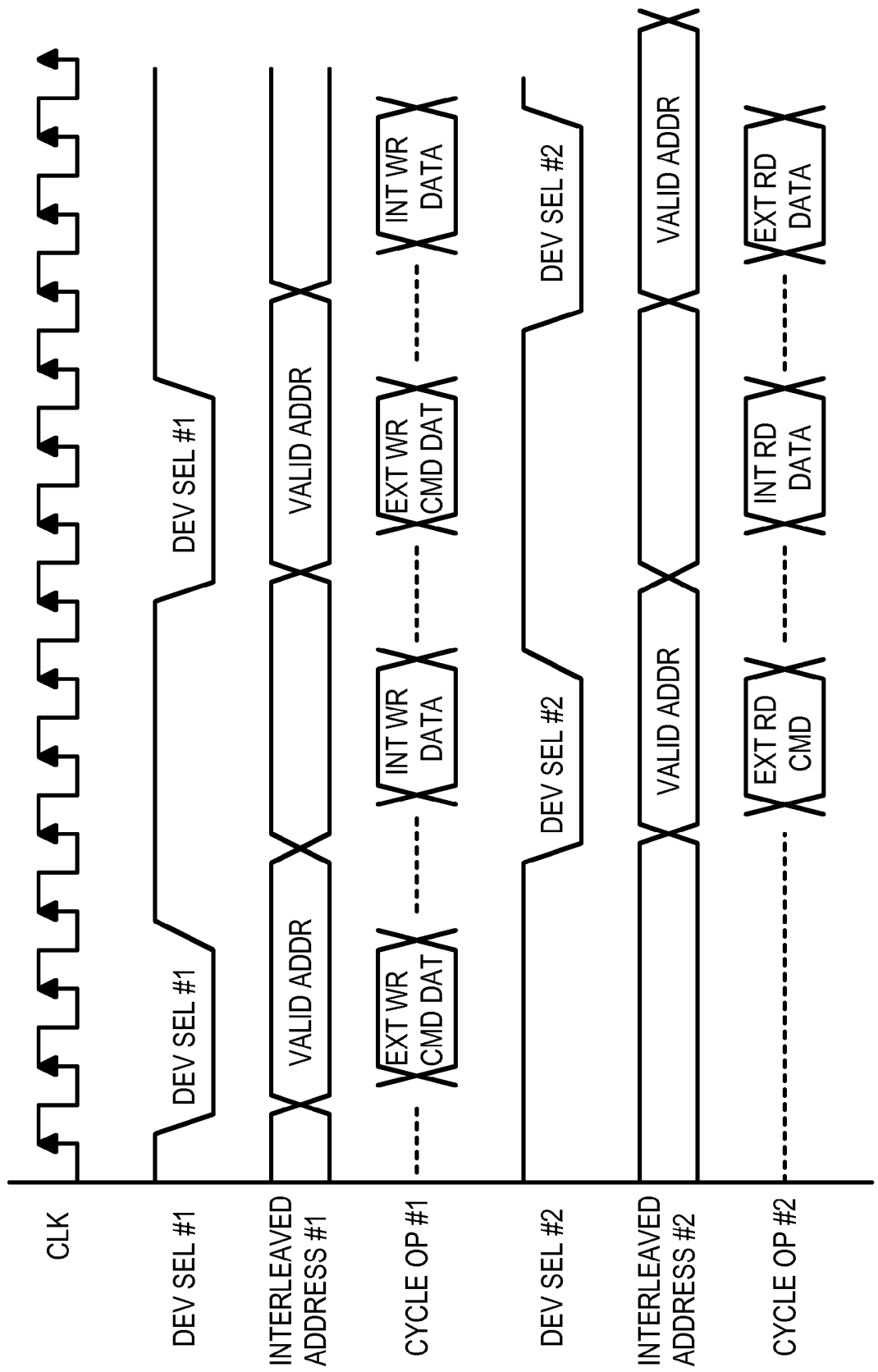
FIG. 10 is a waveform diagram of concurrent read and write to dual flash channels with distributed multi-level caching.

FIG. 10 is a waveform diagram of a concurrent read and write to dual flash channels with distributed multi-level caching. Device select #1 is pulsed low and interleaved address #1 and the write data are latched into the NVMD. This is the external write operation between intelligent NVMD controller 71 and NVMD 73. The internal write of the NV memory array is performed over the next several clock cycles.

Device select #2 is pulsed low during the internal write of device #1. Interleaved address #2 is latched into the NVMD. This is the external read operation between intelligent NVMD controller 71 and another one of NVMD 73. The internal read of the NV memory array is performed over the next several clock cycles. The data is then read to the intelligent NVMD controller as the external read operation as the next address is latched in for device #2.

Figure 11:
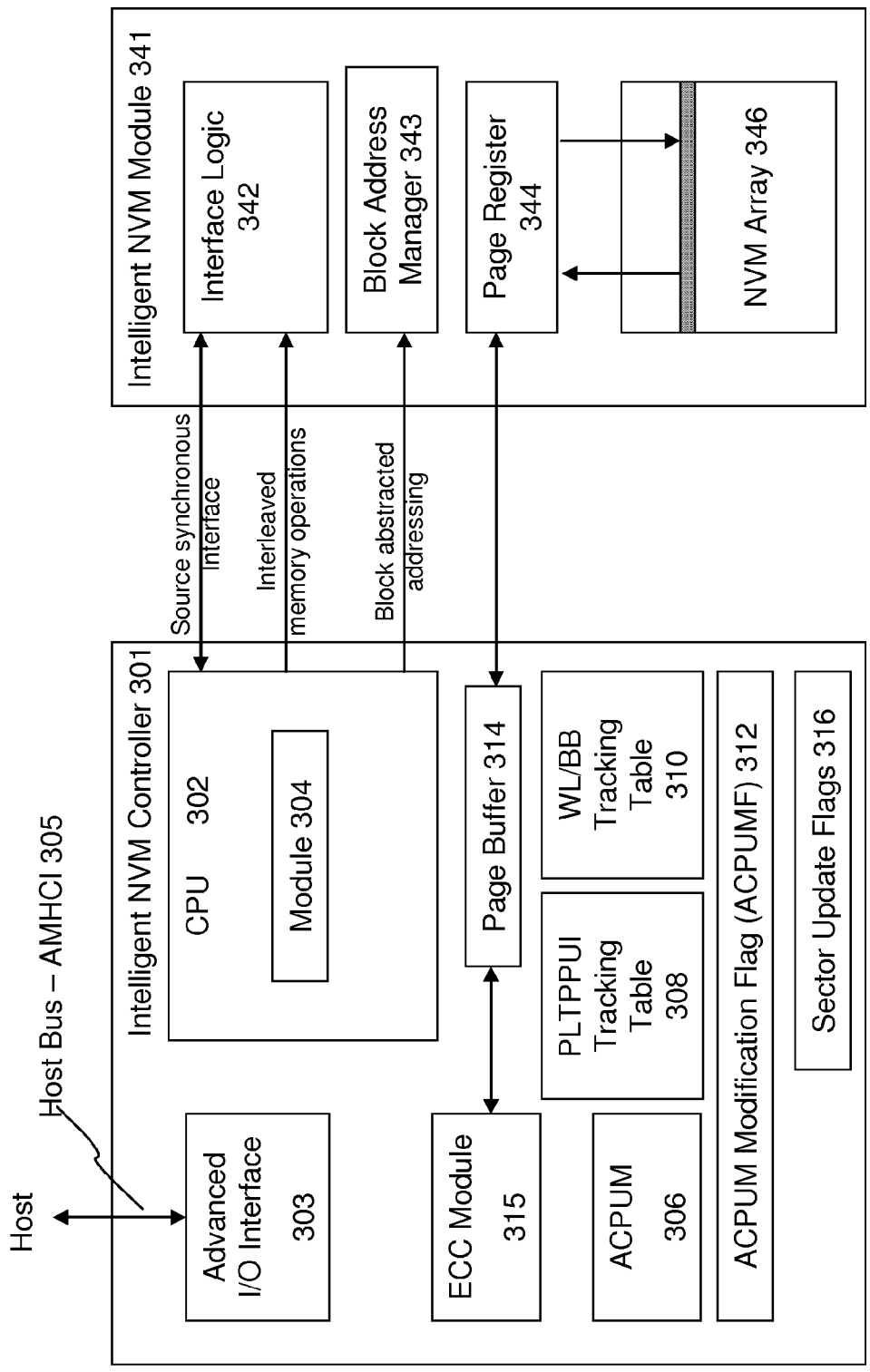
FIG. 11 is a block diagram showing components of a nonvolatile memory device (NVMD).

FIG. 11 is a block diagram showing components of a non-volatile memory device (NVMD). The NVMD has intelligent NVM controller 301 and intelligent NVM module 341. NVM controller 301 has advanced input/output (I/O) interface logic 303, central processing unit (CPU) 302 (e.g., microcontroller, microprocessor), address correlation and page usage memory (ACPUM) 306, partial logical-to-physical address and page usage information (PLTPPUI) tracking table 308, wear leveling and bad block (WL/BB) tracking table 310, ACPUM modification flag (ACPUMF) 312, page buffer 314, error correction code (ECC) module 315 and a set of sector update flags 316.

Advanced I/O interface logic 303 is configured to facilitate data, control signal and power communication with a host (e.g., a computer system, an electronic device, etc.) via host bus 305 in accordance with Advanced Memory Host Control Interface (AMHCI). AMHCI enables communication of data, control signals and power management between intelligent NVM controller 301 and the host. AMHCI is a protocol that works in conjunction with other current and future industry standards including for example, current and future versions of Universal-Serial Bus (USB), Secure Digital, Serial (SD), Micro SD, Multi-Media Card (MMC), Compact Flash (CF), Memory Stick (MS), PCI-Express, a Integrated Drive Electronics (IDE), Serial Advanced Technology Attachment (SATA), Parallel SATA, Radio Frequency Identification (RFID), fiber channel and optical connections, or other equivalent technological standards.

CPU 302 with flash memory controlling program module 304 (e.g., firmware (FW)) installed thereon is configured to control the data transfer between the host computer system and the NVMD. ACPUM 306 is configured to provide an address correlation table, which contains a plurality of entries, each representing a correlation between a partial logical block address (i.e., entries) to the corresponding physical block number. In addition, a set of page usage flags associated with the physical block is also included in each entry. ACPUM 306 represents only one of the N sets of PLTPPUI, which is stored in the reserved area of the flash memory.

In order to keep tracking the physical location (i.e., physical block number) of each of the N sets of PLTPPUI, the physical location is stored in PLTPPUI tracking table 308. Each item is PLTPPUI tracking table 308 corresponds a first special logical address to one of the N sets of PLTPPUI. The wear leveling counters and bad block indicator for each physical block are stored in a number of physical blocks referred by corresponding second special logical addresses (e.g., '0xFFFFFF00').

WL/BB tracking table 310 is configured to store physical block numbers that are assigned or allocated for storing these physical block wear leveling counters and bad blocks. ACPUM modification flag (ACPUMF) 312 is configured to hold an indicator bit that tracks whether ACPUM 306 has been modified or not. Page buffer 314 is configured to hold data in a data transfer request. Page buffer 314 has a size equaling to the page size of the flash memory 201.

Sector update flags 316 are configured to hold valid data flag for each of the corresponding sectors written into data area of page buffer 314. For example, four sector update flags are required for a page buffer comprising four sectors. Page buffer 314 also includes a spare area for holding other vital information such as error correction code (ECC) for ensuring data integrity of the flash memory. The ECC is generated by ECC module 315.

Intelligent NVM module 341 includes interface logic 342, block address manager 343 and at least one NVM array 346. Interface logic 342 is configured for physical memory management. Block address manager 343 is configured to ensure the physical address is converted to a transformed address that is accessible by CPU 302. Each of the at least one NVM array 346 includes page register 344, which corresponds to page buffer 314 for data transfer operations. CPU 302 is further configured to ensure data transfer operation through source synchronous interface, interleaved data operations and block abstracted addressing.

Alternate Embodiments

Several other embodiments are contemplated by the inventors. For example, whereas MLC based NVMD may have four MLC chips with two parallel data channels, different combinations may be used to form other NVMD's, for example, four, eight or more data channels, or eight, sixteen or more MLC chips. The NVMD may be in chains, branches, or arrays. For example, a branch of 4 NVMD could connect as a chain to the NVMD controllers. Other size aggregation or partition schemes may be used for different access of the memory. Flash memory, a phase-change memory, or ferroelectric random-access memory (FRAM), Magnetoresistive RAM (MRAM), Memristor, PRAM, SONOS, Resistive RAM (RRAM), Racetrack memory, and nano RAM (NRAM) may be used.

The host can be a PC motherboard or other PC platform, a mobile communication device, a personal digital assistant (PDA), a digital camera, a combination device, or other device. The host bus or host-device interface can be SATA, PCIE, SD, USB, or other host bus, while the internal bus to the NVMD can be PATA, multi-channel SSD using multiple SD/MMC, compact flash (CF), USB, or other interfaces in parallel. The NVMD may be packaged in a TSOP, BGA, LGA, COB, PIP, SIP, or CSP packages. The internal bus may be fully or partially shared or may be separate buses. The NVMD PCBA system may use a circuit board with other components such as LED indicators, capacitors, resistors, etc.

While a connector and controller chip for SATA has been described, other bus protocols and physical connectors could be substituted, such as small-computer system interface (SCSI), compact flash (CF), Integrated Device Electronics (IDE), PCI Express, ExpressCard, Universal-Serial-Bus (USB), etc. A zero-insertion force (ZIF) connector could also be substituted.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides.

Rather than mount packaged IC's onto the surfaces of the circuit board, unpackaged die may be mounted using diebonding techniques. Using unpackaged die rather than packaged die may reduce the size and weight of the PCBA. Alternately, a Single Chip Non-Volatile Memory Device (NVMD) having a packaged controller and flash die in a single chip package can be used in the PCBA. (see the references CIP "Manufacturing Method for Micro-SD Memory Card", Ser. No. 12/033,854, filed Feb. 19, 2008).

The NVMD may have a packaged controller and flash die in a single chip package that can be integrated either onto a PCBA, or directly onto the motherboard to further simplify the assembly, lower the manufacturing cost and reduce the overall thickness. The single-chip NVMD may use a logical-block address (LBA) addressing scheme, having an internal controller that converts the LBA to a physical internal address of the flash cells. LBA addresses from the host are passed through a bridge chip to one or more NVMD chips on a flash bus. A data traffic controller and timing dispatcher may work in conjunction with the bridge chip to maximize bandwidth and interleaving to the NVMD chips. NVDM chips could also be used with other embodiments including the open frame cards.

Rather than use the flash-drive device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A BlueTooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure.

Figure 1A:
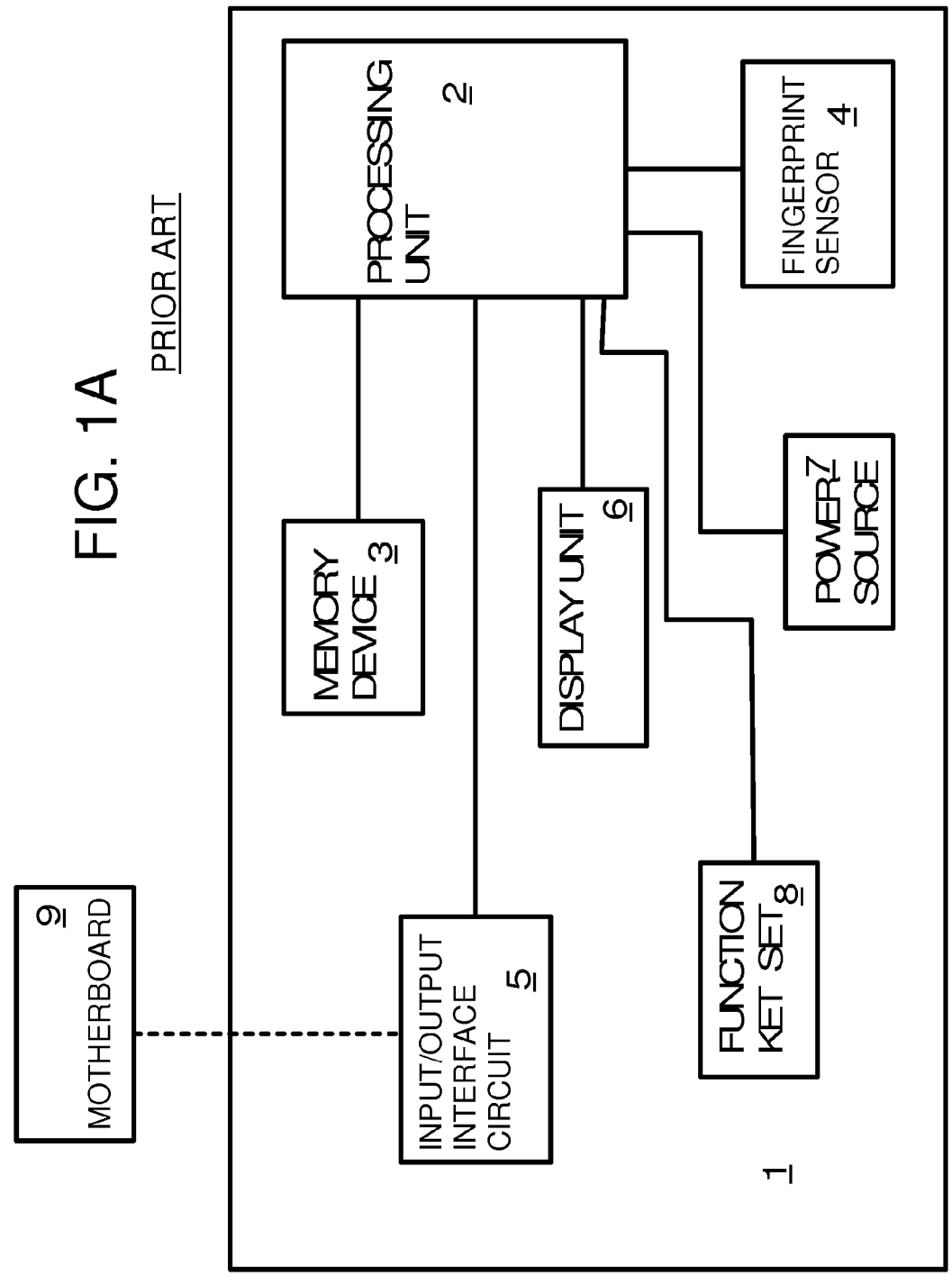
FIG. 1A shows an electronic data flash card.
Figure 1D:
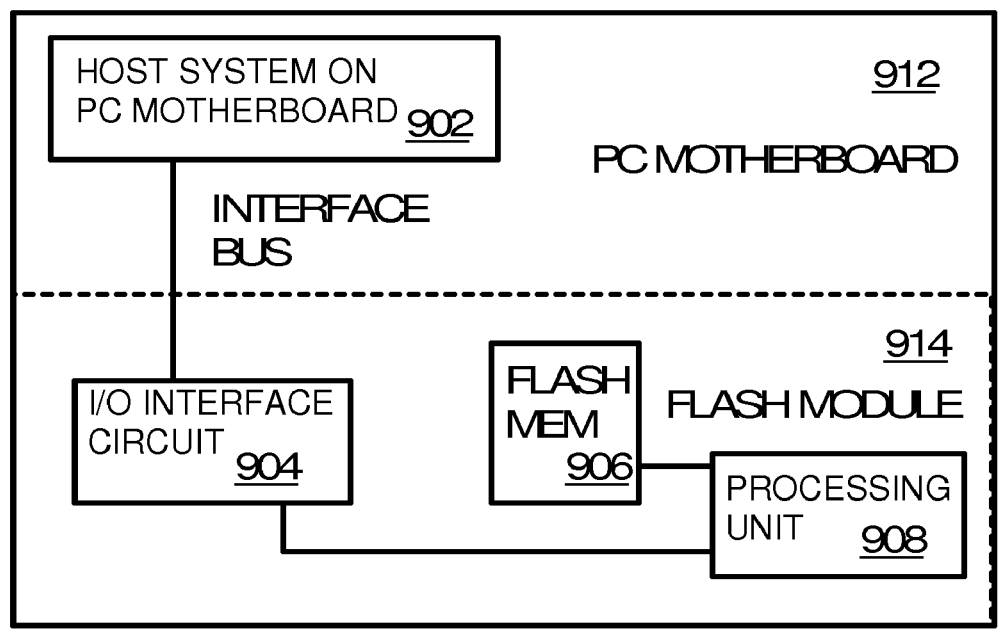
FIG. 1D shows an electronic data flash card in a flash module.

A fingerprint scanner, display, keypad, power supply, or other accessories could be added to the flash-drive device with suitable changes to the casing to allow space and user access to these devices if needed. Alternately, the flash device may delete these components and just have input/output interface circuit 5, processing unit 2, and a flash memory device in the arrangement of FIG. 1A. Power may be supplied through the connector. Input/output interface circuit 5 may be integrated with processing unit 2 as controller chip 45.

An indicator lamp such as an light-emitting diode (LED) could be added to the PCBA. The open case easily allows light from the indicator lamp to be visible. A light pipe or light channel could be added.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A Non-Volatile Memory Device (NVMD) comprising:
   a host-device interface for receiving commands from a host over a host bus;
   a bridge, coupled to the host-device interface, for converting requests from the host into concurrent requests;

a traffic controller and dispatcher, coupled to the bridge, receiving the concurrent requests, for dispatching the concurrent requests over an internal bus;
a plurality of NVMD branches, each NVMD branch coupled to the internal bus to receive one of the concurrent requests from the traffic controller and dispatcher;
wherein each NVMD branch of the plurality of NVMD branches further comprises:
a NVMD controller, coupled to the internal bus, having control logic and a flash channel interface; and
a NVMD memory;
wherein multiple NVMD branches are accessed concurrently in parallel by the concurrent requests;
wherein the NVMD is a single chip integrated onto a single substrate of silicon;
wherein the NVMD memory in each of the NVMD branches comprises:
a memory interface coupled to the flash channel interface;
a non-volatile memory array for storing blocks of data;
a block address manager, for receiving a logical block address (LBA) from the traffic controller and dispatcher, for mapping the LBA to a physical block address (PBA) within a non-volatile memory array in the NVMD;
wherein each NVMD branch of the plurality of NVMD branches further comprises:
a NVMD controller, coupled to the internal bus, having control logic and a plurality of flash channel interfaces;
wherein each of the plurality of flash channel interfaces is coupled to a NVMD memory;
whereby multiple NVMD memory are coupled to each NVMD controller;
wherein the NVMD controller further comprises:
a page buffer;
an address correlation page usage memory (ACPUM);
a partial logical-to-physical address and page usage information (PLTPPUI) tracking table;
a wear leveling counter and bad block indicator (WL/BB) tracking table; and
wherein the plurality NVMD memory include a reserved area for a plurality of first physical blocks and a plurality of second physical blocks, the first physical blocks referenced by a plurality of first special logical addresses while the second physical blocks referenced by a plurality of second special logical addresses;
wherein the plurality of first physical blocks is configured for storing the PLTPPUI tracking table and the plurality of second physical blocks for storing the WL/BB tracking table;
wherein the ACPUM is configured to keep one set, corresponding to a set number, from the PLTPPUI tracking table;
wherein the PLTPPUI tracking table is configured to hold correlations between the first special logical addresses and the first physical blocks;
wherein the WL/BB tracking table is configured to hold correlations between the second special logical addresses and the second physical blocks,
whereby requests from the host are dispatched to multiple NVMD branches.

2. The NVMD of claim 1 wherein the non-volatile memory in the NVMD memory comprises a flash memory, a phase-change memory, ferroelectric random-access memory (FRAM), Magnetoresistive RAM (MRAM), Memristor, PRAM, SONOS, Resistive RAM (RRAM), Racetrack memory, or nano RAM (NRAM).

3. The NVMD of claim 2 wherein access to the NVMD are address-interleaved in a dual-channel arrangement.

4. The NVMD of claim 1 wherein the NVMD controller further comprises:
a controller cache for storing blocks of data for storing in the NVMD memory.

5. The NVMD of claim 4 wherein the NVMD memory further comprises:
a high-speed cache for buffering a block of data for storage in the NVMD memory array,
wherein blocks are cached at two levels, in the NVMD controller and the NVMD memory, and are cached at two levels in each of the multiple NVMD branches.

6. The NVMD of claim 1 wherein the NVMD controller further comprises:
a controller power manager for setting power management policies for the NVMD memory.

7. The NVMD of claim 6 wherein the NVMD memory further comprises:
a local power manager, in the NVMD memory, for reducing power consumed by the NVMD memory in response to power management policies from the controller power manager;
wherein power is managed at two levels, in the NVMD controller and the NVMD memory, and power is managed at two levels in each of the multiple NVMD branches.

8. The NVMD of claim 1 further comprising:
a source clock for generating a clock for the internal bus;
a source synchronous interface, on each of the plurality of NVMD, for synchronizing transfers over the internal bus.

9. The NVMD of claim 1 wherein the ACPUM comprises a plurality of entries, each of the entries corresponding to a physical block number and page usage information of all pages of the physical block number.

10. The NVMD of claim 1 wherein the non-volatile memory in the NVMD memory array comprises a flash memory;
further comprising:
a fingerprint sensor for scanning a fingerprint for verification by the NVMD to enable the host-device interface to send data over the host bus.

11. A storage system comprising:
a connector to a host system, the connector having a host bus;
a host-device interface, coupled to the connector, for interfacing to the host using a host protocol;
a bridge, coupled to the host-device interface, for protocol conversion and handshaking;
a traffic controller and dispatcher, coupled to the bridge and to an internal bus, for dispatching concurrent requests over the host bus for concurrent operations;
a first Non-Volatile Memory Device (NVMD) branch having a first NVMD controller coupled to the internal bus and a first NVMD;
a second NVMD branch having a second NVMD controller coupled to the internal bus and a second NVMD;
wherein the first and second NVMD controller each comprise:
a logic circuit for interfacing to the internal bus;
a flash channel interface for channeling flash commands generated in response to one of the concurrent requests;

a page buffer;
an address correlation page usage memory (ACPUM);
a partial logical-to-physical address and page usage information (PLTPPUI) tracking table;
a wear leveling counter and bad block indicator (WL/BB) tracking table;
wherein the first and second NVMD each comprise:
 a memory interface, coupled to the flash channel interface, for processing the flash commands; and
 a non-volatile memory array for storing blocks of data in response to the flash commands received by the memory interface;
wherein the non-volatile memory array includes a reserved area for a plurality of first physical blocks and a plurality of second physical blocks, the first physical blocks referenced by a plurality of first special logical addresses while the second physical blocks referenced by a plurality of second special logical addresses;
wherein the plurality of first physical blocks is configured for storing the PLTPPUI tracking table and the plurality of second physical blocks for storing the WL/BB tracking table;
wherein the ACPUM is configured to keep one set, corresponding to a set number, from the PLTPPUI tracking table;
wherein the PLTPPUI tracking table is configured to hold correlations between the first special logical addresses and the first physical blocks;
wherein the WL/BB tracking table is configured to hold correlations between the second special logical addresses and the second physical blocks,
wherein concurrent requests are dispatched to the first and second NVMD branches.

12. The storage system of claim 11 wherein the first and second NVMD controller each further comprise:
 a controller cache for caching blocks of data for the non-volatile memory array;
 wherein the first and second NVMD each further comprise:
  a high-speed cache for buffering blocks for storage into the non-volatile memory array,
 whereby multi-level caching is performed.

13. The storage system of claim 11 wherein the first and second NVMD controller each further comprise:
 a president controller for setting one or more policies for channels of memory;
 wherein the policies control power management, wear-leveling, bad block management or replacement for one or more channels of memory;
 wherein the first and second NVMD each further comprise:
  a governor controller for implementing at least one of the policies by reducing power consumption or re-mapping blocks in the non-volatile memory array and the memory interface,
 whereby multi-level power management wear-leveling, bad block management or replacement is performed.

14. The storage system of claim 13 further comprising:
 a third NVMD branch having a third NVMD controller coupled to the internal bus and a third NVMD.

15. The storage system of claim 11 wherein the first NVMD controller has a first memory interface flash channel interface coupled to the first NVMD and a second flash channel interface coupled to a concurrent channel NVMD;
 wherein the second NVMD controller has a third memory interface flash channel interface coupled to the second NVMD and a fourth flash channel interface coupled to a second concurrent channel NVMD.

16. The storage system of claim 15 wherein the first NVMD controller interleaves addresses to the first NVMD and to the concurrent channel NVMD;
 wherein the second NVMD controller interleaves addresses to the second NVMD and to the second concurrent channel NVMD,
 whereby addresses are interleaved to concurrent channel NVMD.

\* \* \* \* \*